United States Patent Office 2,768,946
Patented Oct. 30, 1956

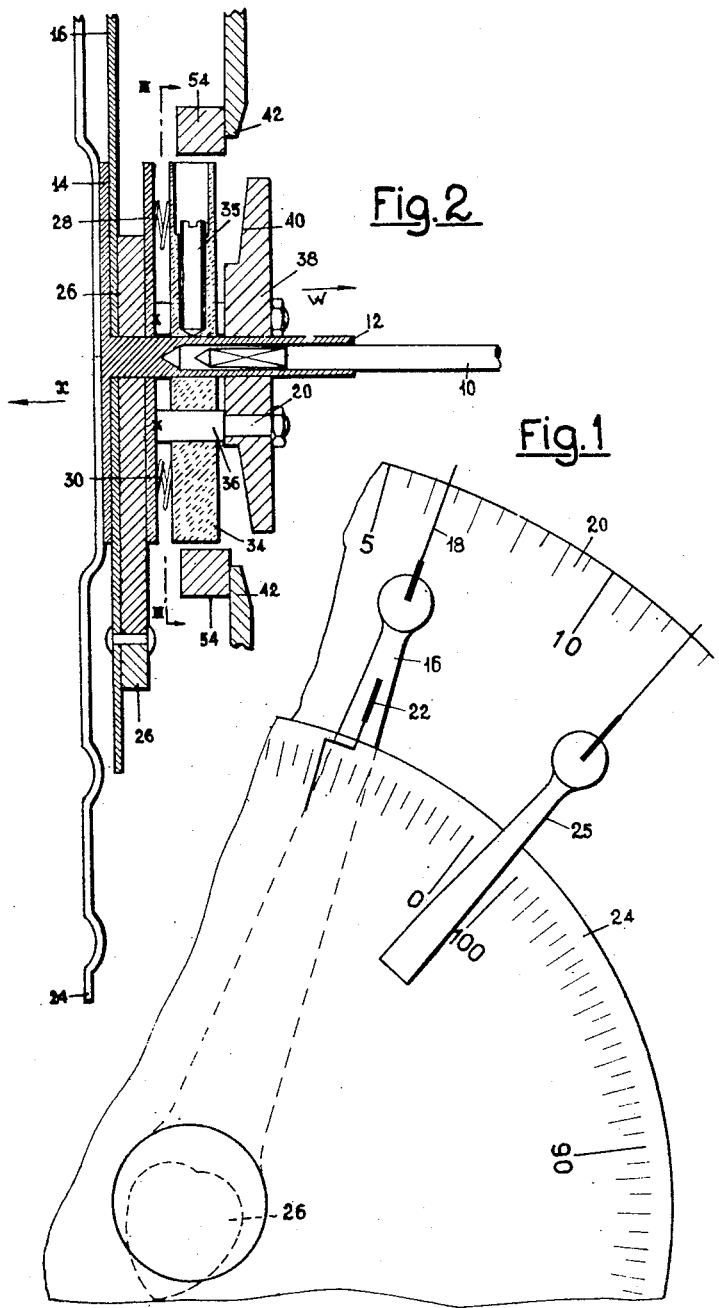

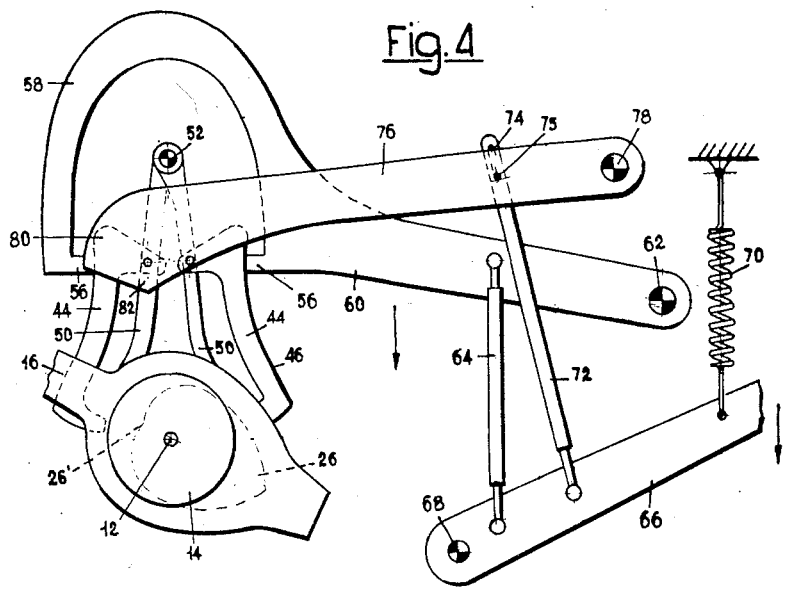
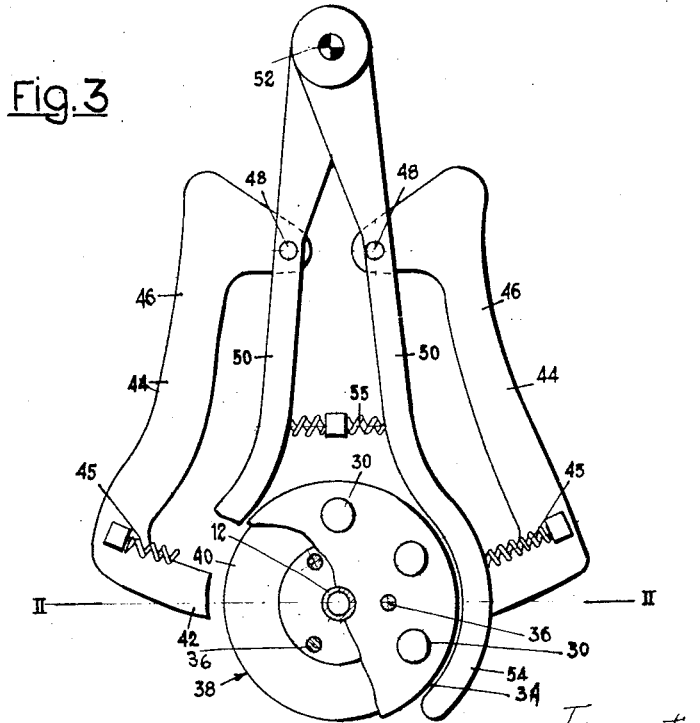

2,768,946

DIAL DEVICES FOR SCALES OR THE LIKE FOR DISENGAGING AND AUTOMATICALLY RESTORING THE POINTER INTO PREESTABLISHED POSITION

Alberto Filippi and Aldo Malafarina, Milan, Italy, assignors to Societa per Azioni Atoma, Milan, Italy, an Italian joint-stock company Application October 12, 1953, Serial No. 385,644

Claims priority, application Italy October 14, 1952

5 Claims. (Cl. 116—129)

The present invention relates to a device for scales or the like with a dial, and to means for disengaging and automatically restoring a pointer cooperable with the dial to a preestablished position.

Heretofore, devices for weighing, such as scales, beam scales or bascules and the like, have required the separate reading of two weights, which must then be added or subtracted. A typical case of this is the reading of weight which includes tare. In this case it is necessary to read, at any time during weighing, the tare and net weight as gross weight.

The actual scales do not read the two weights directly. In this case, the user is obliged to read first the weight of the tare, and, then, determine the net weight by subtraction. This, as may well be imagined causes mistakes and waste of time, and the buyer has no possibility of immediate and efficient control.

The device according to the present invention removes this inconvenience and allows the reading of the tare together with the net weight without performing separate weighing operations of any kind.

The device, is substantially characterized by the insertion in the chain connecting the weighing device of the scales with its pointer of some coupling means that are combined with driving members to perform disengaging of the elements of said coupling means, which members are operatively linked, in their turn, with other means to automatically restore the pointer to a preestablished position, after disengaging said coupling means.

The pivot of the pointer cooperating with the dial of the scales, integrally is connected one of the elements of a friction clutch, the second element of which cooperates with the said pointer that is loosely fitted on its pivot and may be torsionally engaged with it through the said friction clutch.

An advantageous manner of embodying the device, and the constructive and operative features of it, are shown by the following description and annexed drawings.

In the drawing,

Fig. 1 shows, in frontal view, a double dial, with a corresponding pointer, for scales with the device according to the invention.

Fig. 2 is a section on the line II—II, of the Fig. 3.

Fig. 3 is a section on the line III—III, of the Fig. 2.

Fig. 4 shows, on a smaller scale, a front view of the device with the dials removed, but with the means for blocking and restoring to the zero position.

With reference to the figs., 10 indicates a shaft forming a pivot for the weighing equipment, which equipment may be of any type.

On this shaft is a bushing 12 which is integral at one of its free ends with a flange 14. On the bushing 12 and adjacent to the flange 14, is loosely fitted an arm 16, adequately shaped to hold, on one of its ends a first pointer 18, cooperating with a fixed dial 20 (Fig. 1). A second pointer, or auxiliary pointer 22, is fitted on arm 16 pointing in the opposite direction from the pointer 18 and cooperates with a relative dial 24, which is integral with the flange 14 and therefore also with the bushing 12.

On said latter dial is indicated, as will be described below, the weight of the tare, independently of the net weight, which latter is indicated on the dial 20.

On the bushing 12 is also fixed a heart-shaped cam 26 (see the dotted line on Fig. 4), which is fixed to the arm 16. A drilled disk 28 is positioned on the bushing 12 and may cooperate, as described hereafter, with the free surface of the cam 26.

In fact, the disk 28 is urged against the cam 26 by the action of springs 30, which cooperate with the free surface of said disk, the action of said springs being so directed as to constantly press the arm 16 against the flange 14, in order to achieve a frictional connection between the pointers 18 and 22 and the bushing 12.

The other ends of the springs 30 are arranged in seats on a surface of a counterflange 34 (see Fig. 3) that is connected with the bushing 12 by a set screw 35, so the counterflange is integral with the said bushing.

To the drilled disk 28, on the surface which is engaged by the springs 30, are fixed three pivots 36, which pass through suitable holes on the counterflange 34 and engage counterdisk 38, loosely mounted on the bushing 12. This counterdisk has a frusto-conical surface 40, which may be engaged by the wedge-shaped ends 42 of a counterarm couple 44 (see Figs. 3 and 4), that are separated, one from the other, by the action of springs 45. The counterarms 44 have outer sides 46, conveniently shaped and diverging downwardly, for the purpose which will be explained hereafter, while the pivots 48 connect said counterarms with the arms 50. These latter are pivoted one to the other by a pivot 52, fixed to the frame of the device.

The lower ends 54 of said arms are arched to form jaws that may engage the periphery of the counterflange 34 and lock this latter. These jaws support the free end of the spring 45 of the counterarm 44.

Under normal conditions, the arms 50 are mutually separated by the action of the springs 55, arranged between said arms and which are weaker than the springs 45 of the counterarms 44, said latter springs acting also, as already stated, on the arms 50.

The shaped sides 46 of the counterarms 44, may be engaged by the teeth 56 (see Fig. 4) of the fork 58, integral with an arm 60, hinged, by a pivot 62, to the frame of the device.

To this arm is connected one of the ends of an adjustable rod 64, while the other end is pivoted on a driving lever 66, the fulcrum 68 of which is placed on the frame of the device. This lever is drawn upwards in the opposite direction to the arrow X, by a spring 70.

An end of a second adjustable rod 72 is pivoted on the lever 66 and the other end of said rod is provided with a slot, in which a pin 75 slides, which pin is fixed to the arm 76 which is in turn hinged to a pivot 78 on the frame of the device.

The arm 76 has on its free end a shaped head 80, that has a pointed end 82, for cooperating with the periphery of the heart-shaped cam 26.

The heart-shaped cam 26 is so arranged that the axis of the pointers 18 and 22 crosses its point of inflection 26'.

The device operates as follows:

Under normal operating conditions the pointers 18 and 22 are integral with the bushing 12 and therefore, due to the action of the springs 30 on the disk 28, integral with the shaft 10.

In this condition, a weight placed on the scales causes shifting of the pointer 18 on the dial 20, indicating the amount of the weight. The auxiliary pointer 22, cooperating with the auxiliary dial 24, shifts together with the pointer 18, remaining however in the same position relative to the dial 24, because this latter rotates with said pointer as it too is integral with the bushing 12.

During this stage of operation the scale operates as a normal scale. The object representing the tare is placed on the scales when a weighing with tare is to be made, and after the scale has taken the position of stable equilibrium, the lever 66 is moved in the direction of the arrow Z.

The rod 64 (see Fig. 4) causes the shifting of the arm 60 in the direction of the arrow Y, so that the teeth 56, on the fork 58, cooperate with the arched sides 46 of the counterarms 44. Consequently said counterarms are caused to move closer to one another in opposition to the action of the springs 45.

The action of the springs 45 on the arms 50 is amplified (because the springs are further compressed), and the jaws 54 of the arms 50 engage the periphery of the counterflange 34.

The jaws 54 are pressed against the counterflange 34 by arranging the teeth 56 and the arched sides 46, in such a position that, by the movement of the arm 60, the jaws 54 are first caused to engage the counterflange 34.

Consequently, this counterflange is locked in a fixed angular position, and the pointer 18 is also locked in a position corresponding to the position which it has taken on the dial 20, depending on the tare.

The further movement of the lever 60 causes the engagement of the wedge-shaped ends 42 of the counterarms 44 with the conical surface 40 of the counterdisk 38, so that the counterdisk is shifted according to the direction of the arrow W (Fig. 2), and therefore in the opposite direction to the action of the springs 30.

The disk 28 no longer contacts the cam 26 and the arm 16 of the pointer 18 because the connection of the disk 28 to the pivots 36, so that said pointer (and also the cam 26) becomes loose on the bushing 12.

The bushing 12, together with the parts which are integral with it (dial 24 etc.) remains locked in the position corresponding to the weight placed on the scales by means of the engaging action of the jaws 54 on the arms 50 with the counterflange 34. If shifting of the lever 66 is further continued in the direction of the arrow Z, the pin 75 engages the upper end of the slot 74 in the rod 72, so that the movement of lever 66 is also transmitted to the arm 76.

The head 80 of arm 26 is lowered so that either the one or the other of the two surfaces of the tip 82 engages the cam 26. The engagement of the first or the second side of the tip 82 with the periphery of the cam 26 depends on the angular position which is taken by said cam with respect to the vertical axis of symmetry, i. e. from the initial position of the pointer 18.

Therefore, by engaging one or the other surface of the tip 82 with the cam outline and continuing the lowering of the lever 66, the head 80, acting on the cam 26 at the tip 82, causes the cam to rotate in one or the other direction (depending on the engagement with the one or the other surface of the tip 82) to bring the point of inflection 26' of said cam in register with the perpendicular line through the axis of the bushing 12. In this position, the tip 82 is engaged in said zone of said inflection point 26'. Therefore, and also the pointers 18 and 22, are restored to exactly correspond to the zero of the dial 20, namely to the vertical position.

The lever 66 at this time reaches the end of its downward stroke, and it is released.

The spring 70 shifts the lever 66 to its initial position, and this shifting causes, in its turn, the return to the initial position of the arms 60 and 76. Therefore, the counterarms 44 and the arms 50 return to the initial position, under the action of the springs 45 and 55.

When the principal pointer 18 is shifted to the zero position on the dial 20, the counterpointer 22 indicates on the dial 24 the same weight as was indicated by the pointer 18 on the dial 20, that is the tare. In such a manner, this latter may always be read instantaneously during the next weighing; the net weight (that is without the tare) is indicated in the usual manner by the pointer 18.

It is thus possible to read simultaneously at any time, both or either of the tare or the net weight.

The return of the device to its initial position is performed according to the above mentioned manner but without placing any weight on the scales.

In that case, the pointers 18 and 22, and also the dial 24, are simultaneously restored to the zero position.

It is to be understood, the device may be modified and varied in practice, in accordance with its applications and uses. Thus, for instance, a pointer 25 may be substituted on the auxiliary dial 24, which pointer cooperates with the principal dial 20, and will indicate the gross weight.

The device may have two or more of the above mentioned devices for the purpose of performing and reading, at the same time, many weighings.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

What we claim is:

1. A device for use with weighing apparatus comprising a frame, a shaft on said frame connected to said apparatus adapted to be turned by said apparatus when said apparatus measures a weight, a tare weight indicating dial integral with said shaft and having a gross weight pointer thereon at the start of said dial, a clutch mechanism fixed to said shaft adjacent said tare weight indicating dial comprising a counterflange fixed to said shaft, a plurality of pivots slidable in said counterflange parallel to said shaft, a disk slidable on said shaft attached to said pivots, springs between said disk and counterflange and said counterdisk having a frusto-conically shaped portion at the periphery thereof on the opposite ends of said pivots, a net weight pointer journaled on said shaft and frictionally held between the disk of said clutch mechanism and said dial, said pointer having a heart-shaped cam thereon with a point of inflection on the axis of said pointer, a tare weight pointer on said net weight pointer cooperable with said tare weight indicating dial, a weight scale on said frame with which said gross weight pointer and net weight pointer cooperate, and a clutch actuating mechanism comprising a pair of clutch arms pivoted to each other and to said frame, spring means urging said arms apart, the free ends of said arms adapted to engage the periphery of said counterflange, a pair of counterarms, one pivoted to each of said clutch arms near the pivoted connection of said clutch arms to said frame, said counterarms having wedge-shaped ends cooperable with the frusto-conical portion on said counterdisk, spring means connected between the ends of the clutch arms and the counterarms urging the ends of the counterarms away from the clutch arms, a fork arm pivoted to said frame having a fork on the end thereof positioned over said counterarms and adapted on the pivoting of said fork arm to urge said counterarms towards said clutch arms and to engage the wedge-shaped ends with said counterdisk, an actuating lever pivoted on said frame, an adjustable rod connecting said lever with said fork arm to move said fork arm on movement of said actuating lever, a cam actuating arm pivoted to said frame having a head with a pointed portion thereon adapted to cooperate with the inflection of said heart-shaped cam, and an adjustable rod connecting said cam actuating arm with said actuating lever.

2. A device for use with weighing apparatus comprising a frame, a shaft on said frame connected to said apparatus adapted to be turned by said apparatus when said apparatus measures a weight, a tare weight indicating dial integral with said shaft and having a gross weight pointer thereon at the start of said dial, a clutch mechanism fixed to said shaft adjacent said tare weight indicating dial comprising a counterflange fixed to said shaft, a plurality of pivots slidable in said counterflange parallel to said shaft, a disk slidable on said shaft attached to said pivots, springs between said disk and counterflange and said counterdisk having a frusto-conically shaped portion at the periphery thereof on the opposite ends of said pivots, a net weight pointer journaled on said shaft and frictionally held between the disk of said clutch mechanism and said dial, said pointer having a heart-shaped cam thereon with a point of inflection on the axis of said pointer, a tare weight pointer on said net weight pointer cooperable with said tare weight indicating dial, a weight scale on said frame with which said gross weight pointer and net weight pointer cooperate, and clutch actuating means adapted to actuate said clutch to move said disk away from said net weight pointer, an actuating lever pivoted on said frame to which said clutch actuating means is connected, a cam actuating arm pivoted to said frame having a head with a pointed portion thereon adapted to cooperate with the inflection of said heart-shaped cam, and an adjustable rod connecting said cam actuating arm with said actuating lever.

3. A device for use with weighing apparatus comprising a frame, a shaft on said frame connected to said apparatus adapted to be turned by said apparatus when said apparatus measures a weight, tare weight indicating means integral with said shaft, a clutch mechanism fixed to said shaft adjacent said tare weight indicating means comprising a counterflange fixed to said shaft, a plurality of pivots slidable in said counterflange parallel to said shaft, a disk slidable on said shaft and attached to said pivots, spring means between said disk and said counterflange, and a counterdisk having a frusto-conically shaped portion at the periphery thereof on the opposite end of said pivots, a net weight pointer journaled on said shaft and frictionally held between the disk of said clutch mechanism and said tare weight indicating means, said pointer having a heart-shaped cam thereon with a point of inflection on the axis of said pointer, a tare weight pointer on said net weight pointer cooperable with said tare weight indicating means, a weight scale on said frame with which said net weight pointer cooperates, and clutch actuating means adapted to actuate said clutch to move said disk away from said net weight pointer, an actuating lever pivoted on said frame to which said clutch actuating means is connected, a cam actuating arm pivoted to said frame having a head with a pointed portion thereon adapted to cooperate with the inflection of said heart-shaped cam, and an adjustable rod connecting said cam actuating arm with said actuating lever.

4. A device for use with weighing apparatus comprising a frame, a shaft on said frame connected to said apparatus adapted to be turned by said apparatus when said apparatus measures a weight, tare weight indicating means integral with said shaft, a clutch mechanism fixed to said shaft adjacent said tare weight indicating means, a net weight pointer journaled on said shaft and frictionally held between said clutch mechanism and said tare weight indicating means, said pointer having a heart-shaped cam thereon with the point of inflection on the axis of said pointer, a tare weight pointer on said net weight pointer cooperable with said tare weight indicating means, a weight scale on said frame with which said net weight pointer is cooperable, and clutch actuating means adapted to actuate said clutch to move said disk away from said net weight pointer, an actuating lever pivoted on said frame to which said clutch actuating means is connected, a cam actuating arm pivoted to said frame having a head with a pointed portion thereon adapted to cooperate with the inflection of said heart-shaped cam, and an adjustable rod connecting said cam actuating arm with said actuating lever.

5. A device for use with weighing apparatus comprising a frame, a shaft on said frame connected to said apparatus adapted to be turned by said apparatus when said apparatus measures a weight, a tare weight indicating means integral with said shaft, a clutch mechanism fixed to said shaft adjacent said tare weight indicating means, a net weight pointer journaled on said shaft and frictionally held between said clutch mechanism and said tare weight indicating means, said pointer having cam means thereon, a tare weight pointer on said net weight pointer cooperable with said tare weight indicating means, a weight scale on said frame with which said net weight pointer is cooperable, and clutch actuating means adapted to move said clutch mechanism away from said tare weight indicating means, actuating means pivoted on said frame to which said clutch actuating means is connected, cam actuating means pivoted to said frame having a head portion cooperable with said cam means to position said pointer, and means connecting said cam actuating means with said actuating means.

References Cited in the file of this patent

UNITED STATES PATENTS

| | | |
|---|---|---|
| 1,318,511 | Thomas | Oct. 14, 1919 |
| 1,623,820 | West | Apr. 5, 1927 |
| 2,505,237 | Dwyer | Apr. 25, 1950 |